United States Patent
Yamamoto et al.

(10) Patent No.: US 12,107,401 B2
(45) Date of Patent: Oct. 1, 2024

(54) WIRING HARNESS MODULE AND WIRING HARNESS ROUTING DEVICE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Satoshi Yamamoto, Mie (JP); Nahoko Furuhata, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 256 days.

(21) Appl. No.: 17/436,019

(22) PCT Filed: Dec. 12, 2019

(86) PCT No.: PCT/JP2019/048685
§ 371 (c)(1),
(2) Date: Sep. 2, 2021

(87) PCT Pub. No.: WO2020/179175
PCT Pub. Date: Sep. 10, 2020

(65) Prior Publication Data
US 2022/0181858 A1  Jun. 9, 2022

(30) Foreign Application Priority Data
Mar. 5, 2019  (JP) ................. 2019-039788

(51) Int. Cl.
 *H02G 3/04* (2006.01)
 *B60R 16/02* (2006.01)
 *H02G 11/00* (2006.01)

(52) U.S. Cl.
 CPC .......... *H02G 3/04* (2013.01); *B60R 16/0215* (2013.01); *H02G 11/00* (2013.01)

(58) Field of Classification Search
 CPC .......... H02G 3/04; H02G 3/32; H02G 3/0487; H02G 3/0616; H02G 11/00; H02G 11/006; B60R 16/0215
 See application file for complete search history.

(56) References Cited

U.S. PATENT DOCUMENTS

| | | | | |
|---|---|---|---|---|
| 4,768,287 A | * | 9/1988 | Thies | H01R 12/675 |
| | | | | 174/84 C |
| 5,111,362 A | * | 5/1992 | Flamm | H05K 5/0008 |
| | | | | 361/752 |

(Continued)

FOREIGN PATENT DOCUMENTS

| | | | | | |
|---|---|---|---|---|---|
| JP | H0636140 U | * | 5/1994 | | H01B 7/08 |
| JP | 2007104828 A | * | 4/2007 | | B60R 6/02 |
| JP | 2013-116028 A | | 6/2013 | | |

OTHER PUBLICATIONS

International Search Report issued on Feb. 10, 2020 for WO 2020/179175 A1 (4 pages).

*Primary Examiner* — Paresh Paghadal
(74) *Attorney, Agent, or Firm* — Venjuris, P.C.

(57) ABSTRACT

A wiring harness module 20 disclosed by this specification includes a wiring harness 30 having at least one wire 32 fixed along a strip-like base member, a holding member 40 for holding a sheet-like margin portion 36 different from a part fixed to the wire 32 in the base member, and a protector 60 to be mounted on a slidable slider. The protector 60 includes an accommodating portion 62 for accommodating (Continued)

the holding member 40, and the accommodating portion 62 includes a front wall 74 and a back wall 75 lockable to the holding member 40 in a front-back direction.

5 Claims, 10 Drawing Sheets

(56) References Cited

U.S. PATENT DOCUMENTS

| | | | | |
|---|---|---|---|---|
| 6,340,199 | B1* | 1/2002 | Fukumoto | E05F 15/44 |
| | | | | 296/155 |
| 6,732,983 | B1* | 5/2004 | Blake | F16L 3/1236 |
| | | | | 248/74.2 |
| 7,369,381 | B2 | 5/2008 | Tsukamoto et al. | |
| 7,551,448 | B2* | 6/2009 | Roberts | H05K 3/365 |
| | | | | 361/800 |
| 10,797,477 | B1* | 10/2020 | Peterson | H02G 3/32 |
| 10,836,332 | B2 | 11/2020 | Yamamoto et al. | |
| 2002/0092666 | A1* | 7/2002 | Hasegawa | H01R 12/772 |
| | | | | 174/92 |
| 2007/0025061 | A1 | 2/2007 | Kogure et al. | |
| 2007/0066101 | A1* | 3/2007 | Suzuki | B60R 16/0215 |
| | | | | 439/99 |
| 2007/0066125 | A1* | 3/2007 | Uenver | H01R 13/73 |
| | | | | 439/459 |
| 2019/0165530 | A1* | 5/2019 | Katsuramaki | B60J 7/0573 |
| 2020/0176960 | A1* | 6/2020 | Tomosada | H02G 11/00 |

* cited by examiner

WIRING HARNESS MODULE AND WIRING HARNESS ROUTING DEVICE

CROSS REFERENCE TO RELATED APPLICATIONS

This application is a national phase of PCT application No. PCT/JP2019/048685, filed on 12 Dec. 2019, which claims priority from Japanese patent application No. 2019-039788, filed on 5 Mar. 2019, all of which are incorporated herein by reference.

TECHNICAL FIELD

A technique disclosed by this specification relates to a wiring harness module and a wiring harness routing device.

BACKGROUND

A wiring harness routing device for routing a wiring harness over a vehicle body and a slidable seat is known, for example, from Japanese Patent Laid-open Publication No. 2007-020385 (Patent Document 1 below). This wiring harness routing device includes a wiring harness formed by bundling a plurality of wires, a movable holder for holding the wiring harness in the seat and a fixed holder for holding the wiring harness in the vehicle body. The wiring harness is bundled and firmly fixed to the movable holder by a binding member, and the movable holder moves as the seat slides, whereby the wiring harness also moves.

PRIOR ART DOCUMENT

Patent Document

Patent Document 1: JP 2007-020385 A

SUMMARY OF THE INVENTION

Problems to be Solved

When the wiring harness is firmly fixed by the binding member as described above, the binding member bites into the wires of the wiring harness if a large load is applied, for example, to the wiring harness or movable holder as the seat moves. If the binding member bites into the wires to a large extent, the wires are damaged.

A technique for suppressing the damage of wires of a wiring harness is disclosed in this specification.

Means to Solve the Problem

The technique disclosed by this specification is directed to a wiring harness module with a wiring harness having at least one wire fixed along a strip-like base member, a holding member for holding a sheet-like margin portion different from a part fixed to the wire in the base member, and a protector to be mounted on a slidable slider, wherein the protector includes an accommodating portion for accommodating the holding member, and the accommodating portion includes a locking portion lockable to the holding member in an extending direction of the wiring harness.

Effect of the Invention

According to the technique disclosed by this specification, it is possible to suppress the damage of wires of a wiring harness.

DETAILED DESCRIPTION TO EXECUTE THE INVENTION

Summary of Embodiments

First, embodiments disclosed in this specification are summarized.

(1) A wiring harness module includes a wiring harness having at least one wire fixed along a strip-like base member, a holding member for holding a sheet-like margin portion different from a part fixed to the wire in the base member, and a protector to be mounted on a slidable slider, wherein the protector includes an accommodating portion for accommodating the holding member, and the accommodating portion includes a locking portion lockable to the holding member in an extending direction of the wiring harness.

According to the wiring harness module thus configured, the margin portion different from the part fixed to the wire is held by the holding member and the holding member holding the margin portion is accommodated into the accommodating portion of the protector. In the accommodating portion, the holding member is lockable to the locking portion of the accommodating portion in the extending direction of the wiring harness. In this way, the wiring harness can be fixed to the slider not to shift in position. Further, if such a load as to pull the wiring harness is applied to the wiring harness, the load is applied to the margin portion of the wiring harness, the holding member and the locking portion for the holding member and the protector. That is, the application of a load to the wire can be suppressed and the damage of the wire can be avoided.

(2) The holding member may include at least one pair of sandwiching portions for sandwiching the margin portion from both sides, and each sandwiching portion may include a plurality of protrusions projecting toward the margin portion.

According to this configuration, the plurality of protrusions in the pair of sandwiching portions bite into the margin portion of the base member, whereby the detachment of the wiring harness from the protector can be suppressed. Further, according to this configuration, a reduction in the strength of the margin portion can be prevented, for example, as compared to the case where a margin portion is held by a holding member penetrating through the margin portion.

(3) The plurality of protrusions in one of the pair of sandwiching portions and the plurality of protrusions in the other of the pair of sandwiching portions may be alternately arranged, and the margin portion may be arranged to meander between the plurality of protrusions alternately arranged.

According to this configuration, the protrusions can bite into the margin portion to an increased extent, for example, as compared to the case where the plurality of protrusions are arranged at the same positions between the pair of sandwiching portions with the margin portion as a boundary. In this way, a holding force for the wiring harness in the protector can be enhanced.

(4) A plurality of the wires may be fixed side by side along the base member, the margin portion may be formed on each of both sides of the part fixed to the wires, the protector may include two pairs of sandwiching portions for sandwiching the respective sandwiching portions, the two pairs of sandwiching portions may be coupled by a pair of coupling portions, and the pair of coupling portions may be further coupled by a hinge.

According to this embodiment, a load applied to the wiring harness can be distributed to both sides of the plurality of wires in the wiring harness. That is, a load applied to the margin portion can be reduced as compared to the case where a load is applied to one end part of the wiring harness. In this way, the holding force for the wiring harness in the protector can be enhanced. Further, according to this embodiment, the two pairs of the sandwiching portions are coupled by the pair of coupling portions and the pair of coupling portions are coupled by the hinge. That is, since the holding member can be constituted by a single member, an increase in the number of components can be suppressed and an assembly operation of assembling the holding member with the wiring harness can be facilitated, for example, as compared to the case where the respective sandwiching portions are individually configured.

(5) A wiring harness routing device includes the above wiring harness module, and an extra length accommodating portion for accommodating an extra length of the wiring harness of the wiring harness module.

Details of Embodiment

The wiring harness module and the wiring harness routing device disclosed in this specification are not limited to the following illustration and are intended to be represented by claims and include all changes in the scope of claims and in the meaning and scope of equivalents.

Embodiment

One embodiment of the technique disclosed in this specification is described with reference to FIGS. 1 to 11.

Figure 1:
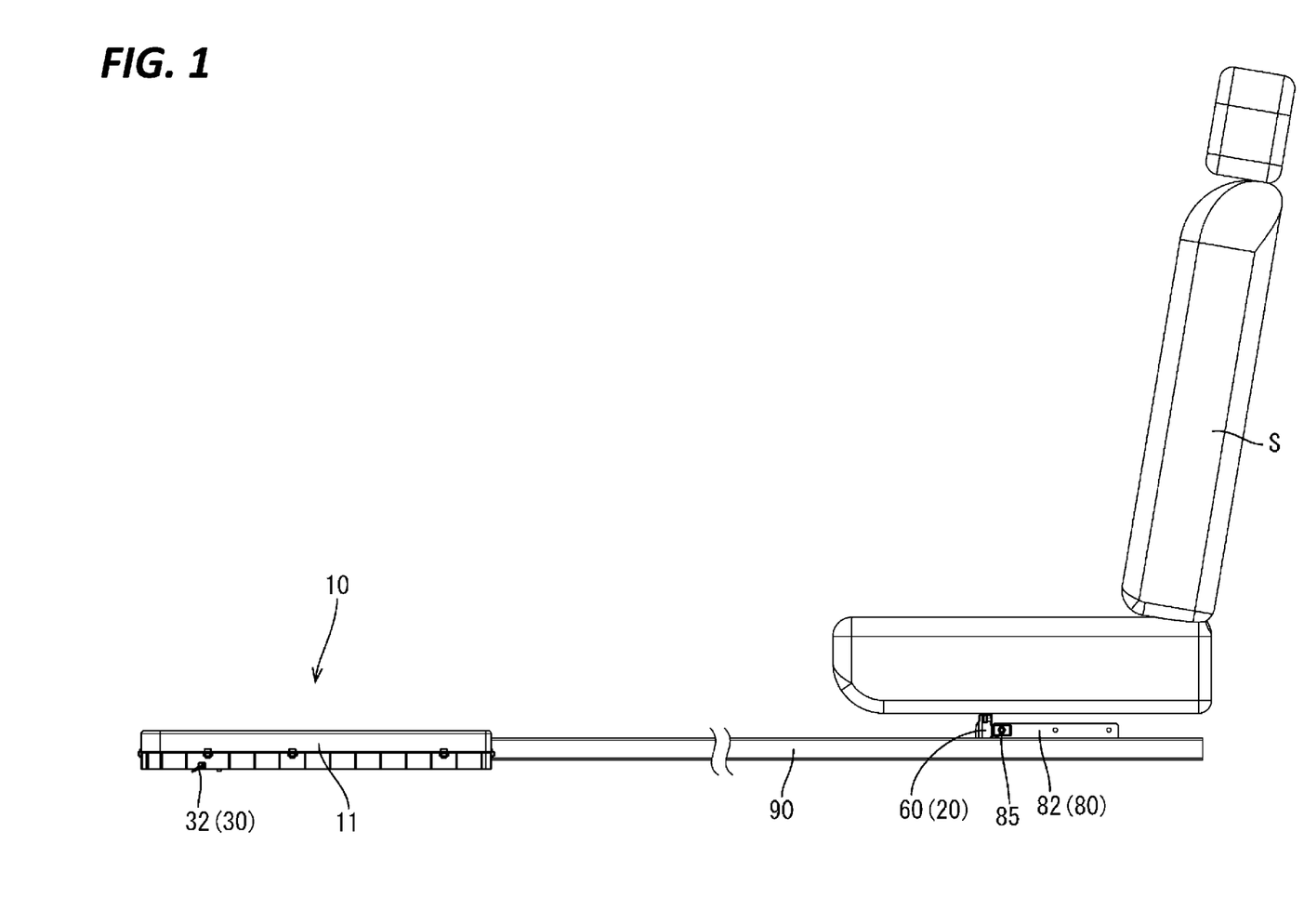
FIG. 1 is a side view of a wiring harness routing device mounted on a slidable seat slider.

A wiring harness routing device 10 for routing a wiring harness 30 between an unillustrated floor part of a vehicle and a seat S slidably mounted on a pair of rails 90 is illustrated in this embodiment as shown in FIG. 1.

(Rails 90)

Figure 2:
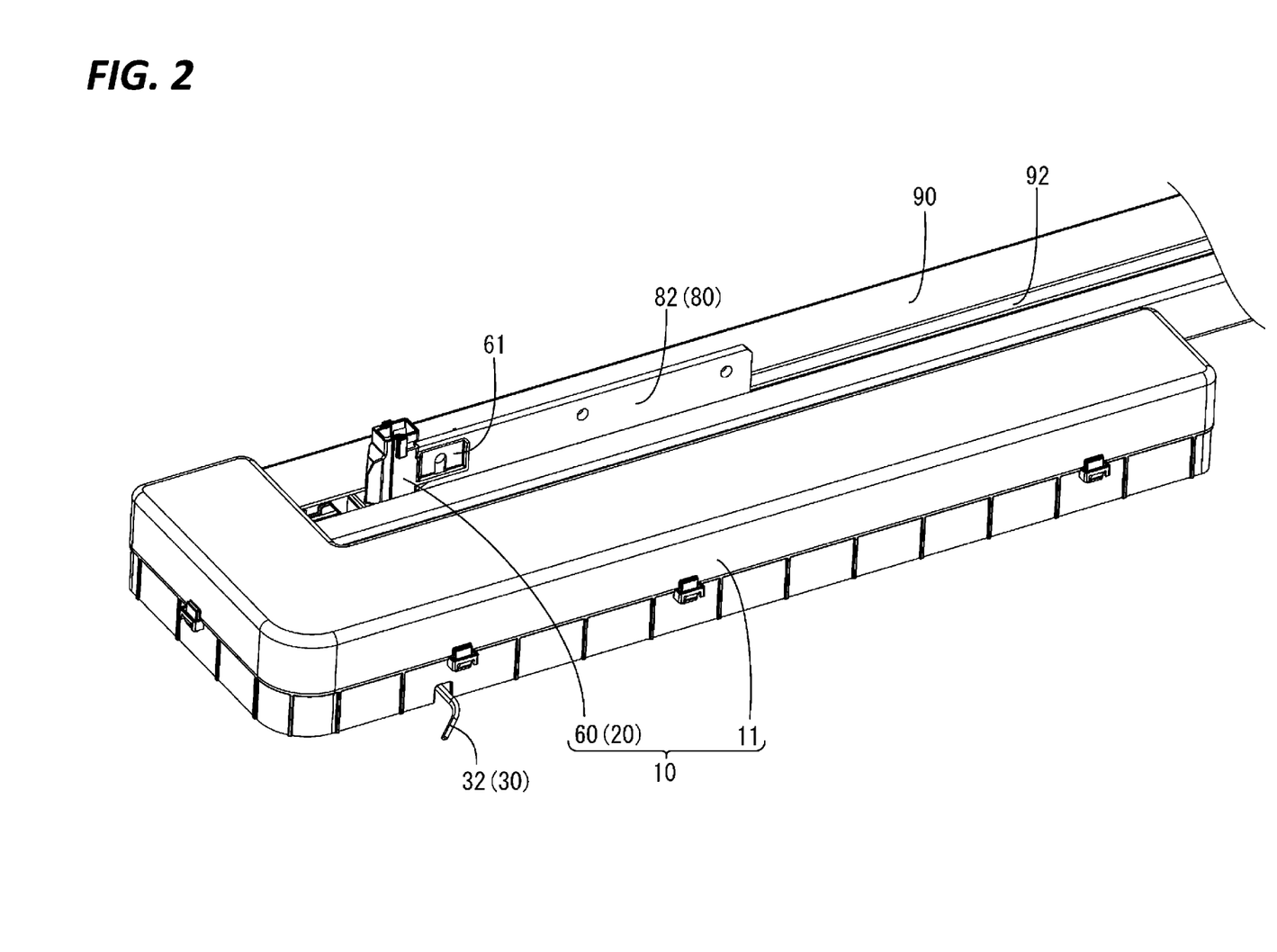
FIG. 2 is a perspective view of the wiring harness routing device mounted on the slider.

The pair of rails 90 are respectively made of metal and in the form of rectangular tubes long in a front-back direction as shown in FIGS. 1 and 2. An arbitrary metal such as stainless steel, aluminum or aluminum alloy can be appropriately selected, if necessary, as a metal constituting the rails 90. The pair of rails 90 are arranged in parallel while being laterally spaced apart on a floor.

A seat slider 80 to be attached to the seat S is arranged movably in a front-back direction in one rail 90.

(Slider 80)

The slider 80 is, for example, made of synthetic resin or metal and slidable in the front-back direction between a back position where the slider 80 is arranged in a back end part of the rail 90 as shown in FIG. 1 and a front position where the slider 80 is arranged in a front end part of the rail 90 as shown in FIG. 2.

As shown in FIG. 2, a mounting portion 82 projecting upwardly of the rail 90 through a through groove 92 provided in an upper part of the rail 90 is provided on top of the slider 80.

The mounting portion 82 is fixed to an unillustrated seat-side mounting portion provided on the seat S by bolts or the like. In this way, the seat S is slidable in the front-back direction on the rails 90.

A later-described wiring harness module 20 of the wiring harness routing device 10 is attached to a front end part of the mounting portion 82.

(Wiring Harness Routing Device 10)

As shown in FIG. 2, the wiring harness routing device 10 includes the wiring harness module 20 for fixing the wiring harness 30 to the slider 80 and a harness accommodating portion 11 for accommodating an extra length of the wiring harness 30.

(Harness Accommodating Portion 11)

As shown in FIG. 2, the harness accommodating portion 11 is mounted on a front end part of the rail 90. The harness accommodating portion 11 is in the form of a box extending along a side part of the rail 90 from the front end part of the rail 90. The inside of the harness accommodating portion 11 communicates with a front end opening of the rail 90 and an extra length part of the wiring harness 30 formed as the slider 80 moves is accommodated into the harness accommodating portion 11.

(Wiring Harness Module 20)

Figure 3:
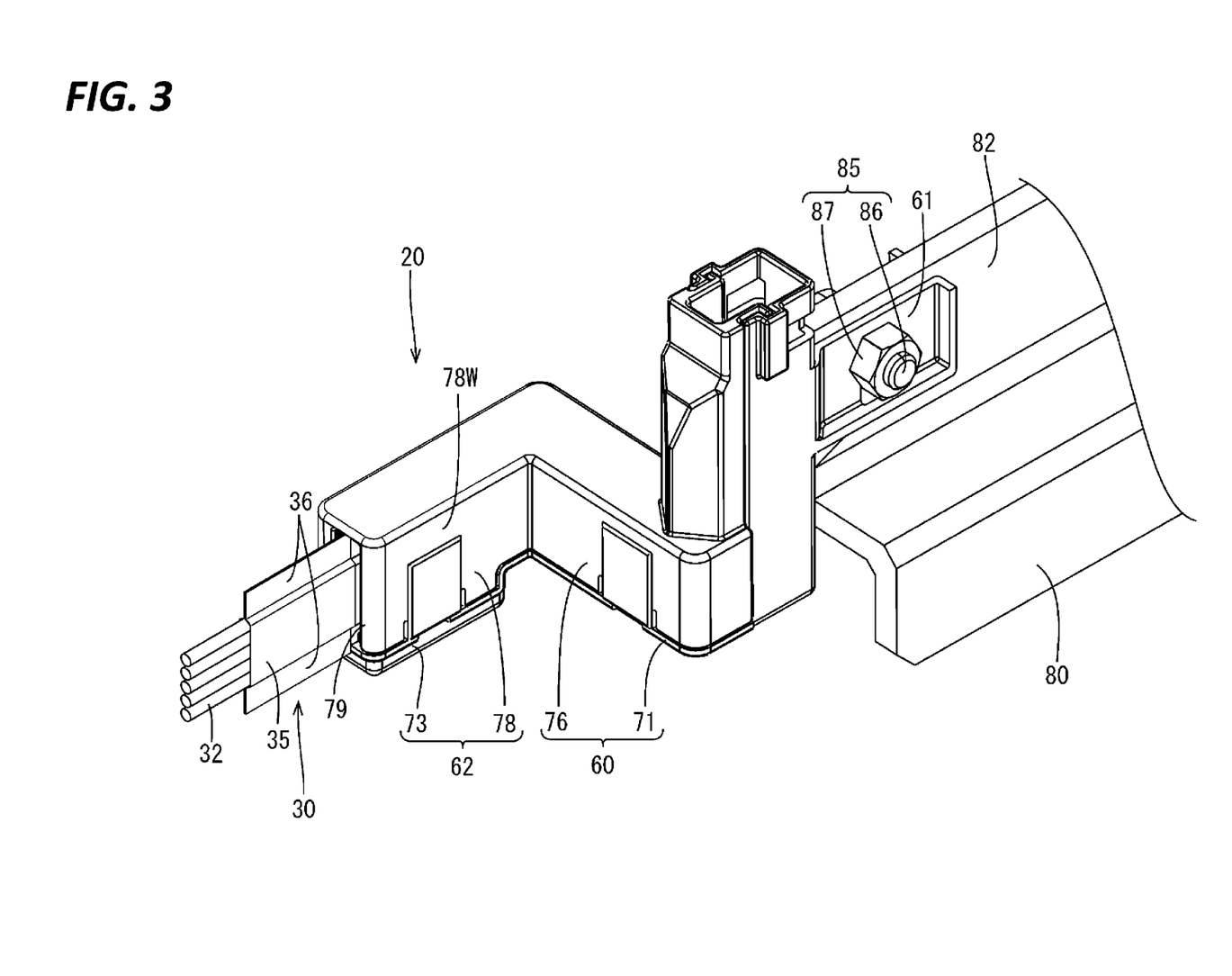
FIG. 3 is a perspective view of a wiring harness module attached to the slider.

As shown in FIG. 3, the wiring harness module 20 includes the wiring harness 30 having a plurality of wires 32, a holding member 40 for holding the wiring harness 30 and a protector 60 for fixing the holding member 40 to the slider 80.

(Wiring Harness 30)

As shown in FIGS. 3 to 7, the wiring harness 30 includes the plurality of wires 32 each formed by covering a core with an insulation coating, and a pair of base members 34 for fixing the plurality of wires 32 by sandwiching the wires 32 from both sides. The wiring harness 30 in this embodiment is configured such that five wires 32 are sandwiched from both sides by the pair of base members 34.

Figure 7:
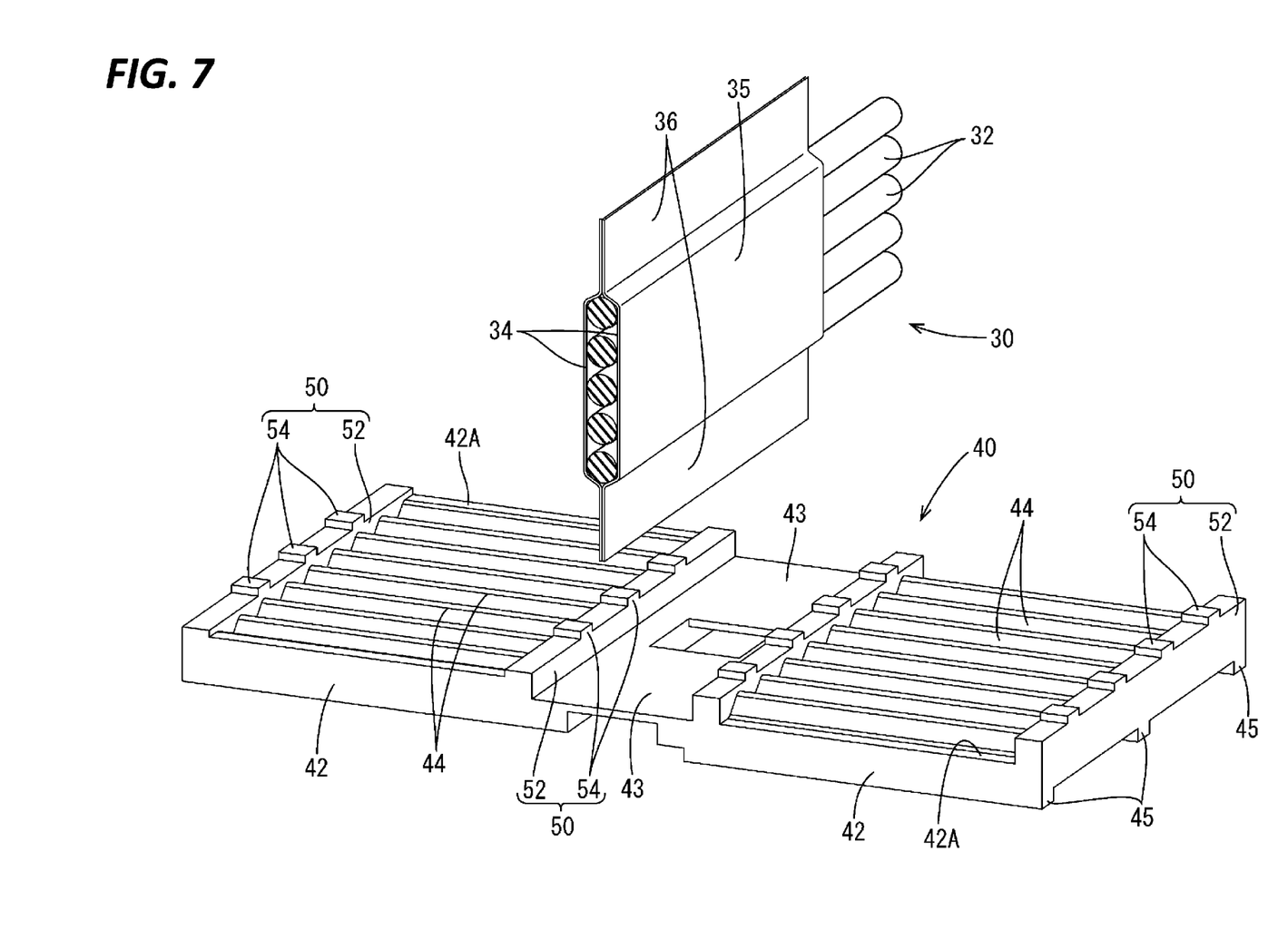
FIG. 7 is a perspective view showing a state before a wiring harness and a holding member are assembled.

As shown in FIG. 7, the pair of base members 34 are formed into strips long in the front-back direction by a sheet-like nonwoven fabric. The nonwoven fabric is a fabric formed by entangling or bonding fibers and is, for example, a fiber sheet, a web (thin membrane-like sheet made of only fibers) or a bat (blanket-like fibers). In this embodiment, the base member 34 is made of a fiber sheet. Further, the base member 34 may be a woven fabric produced by weaving natural fibers or synthetic fibers.

The five wires 32 are fixed flatly side by side in a vertical direction along the base members 34 in vertically central parts of the base members 34.

As shown in FIGS. 3 to 7, a part of the wiring harness 30 in which the five wires 32 are sandwiched and fixed by the pair of base members 34 serves as a wire fixing portion 35, and both vertical sides of the wire fixing portion 35 serve as margin portions 36 in which the base members 34 are fixed to each other.

The wires 32 are fixed to the base members 34 by a known fixing method such as the bonding of the wires 32 to the base members 34 by ultrasonic welding or heat welding, the fixing of the wires 32 to the base members 34 by an adhesive or glue or the sewing of the wires 32 to the base members 34. The base members 34 are fixed to each other in the margin portions 36 by a known fixing method such as the bonding of the base members 34 to each other by ultrasonic welding or heat welding or the fixing of the base members 34 to each other by an adhesive or glue.

Figure 5:
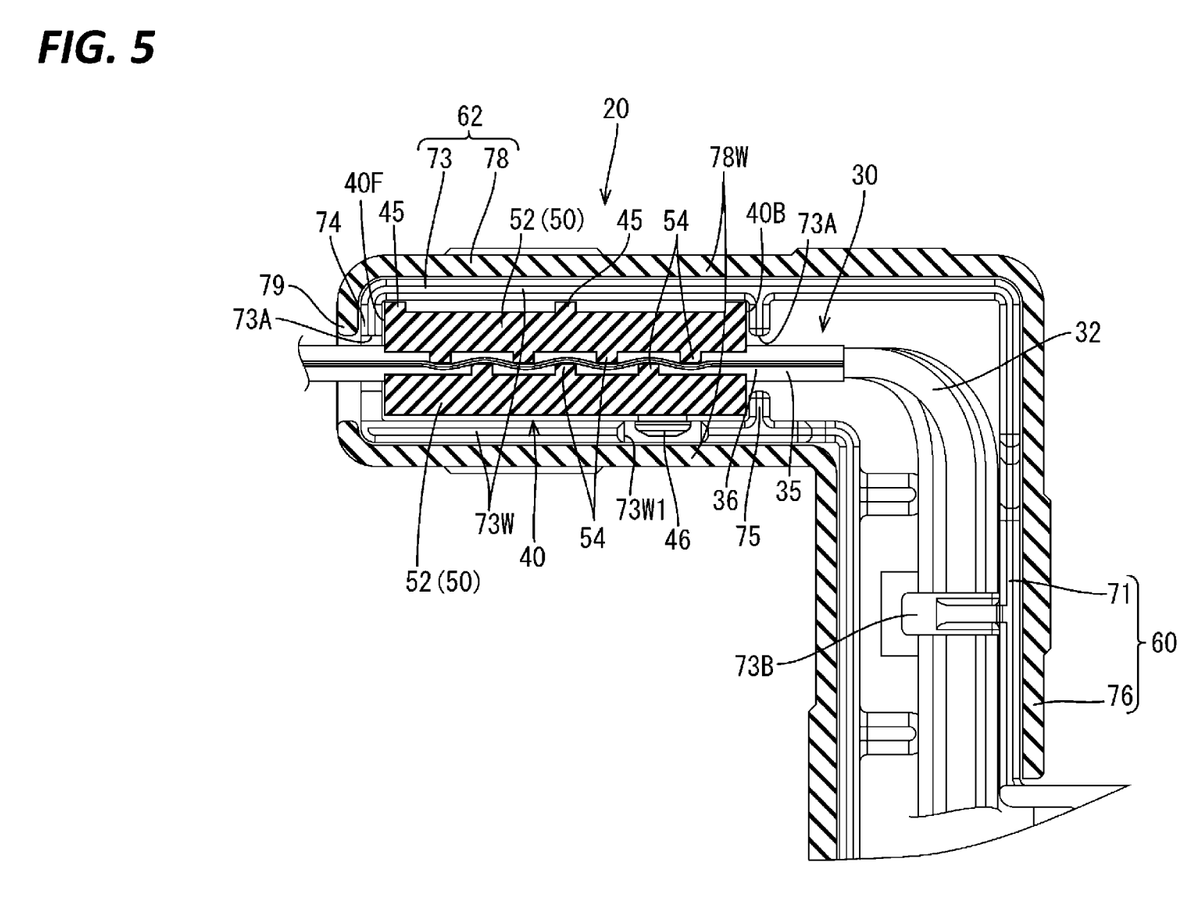
FIG. 5 is a section along A-A of FIG. 4.
Figure 6:
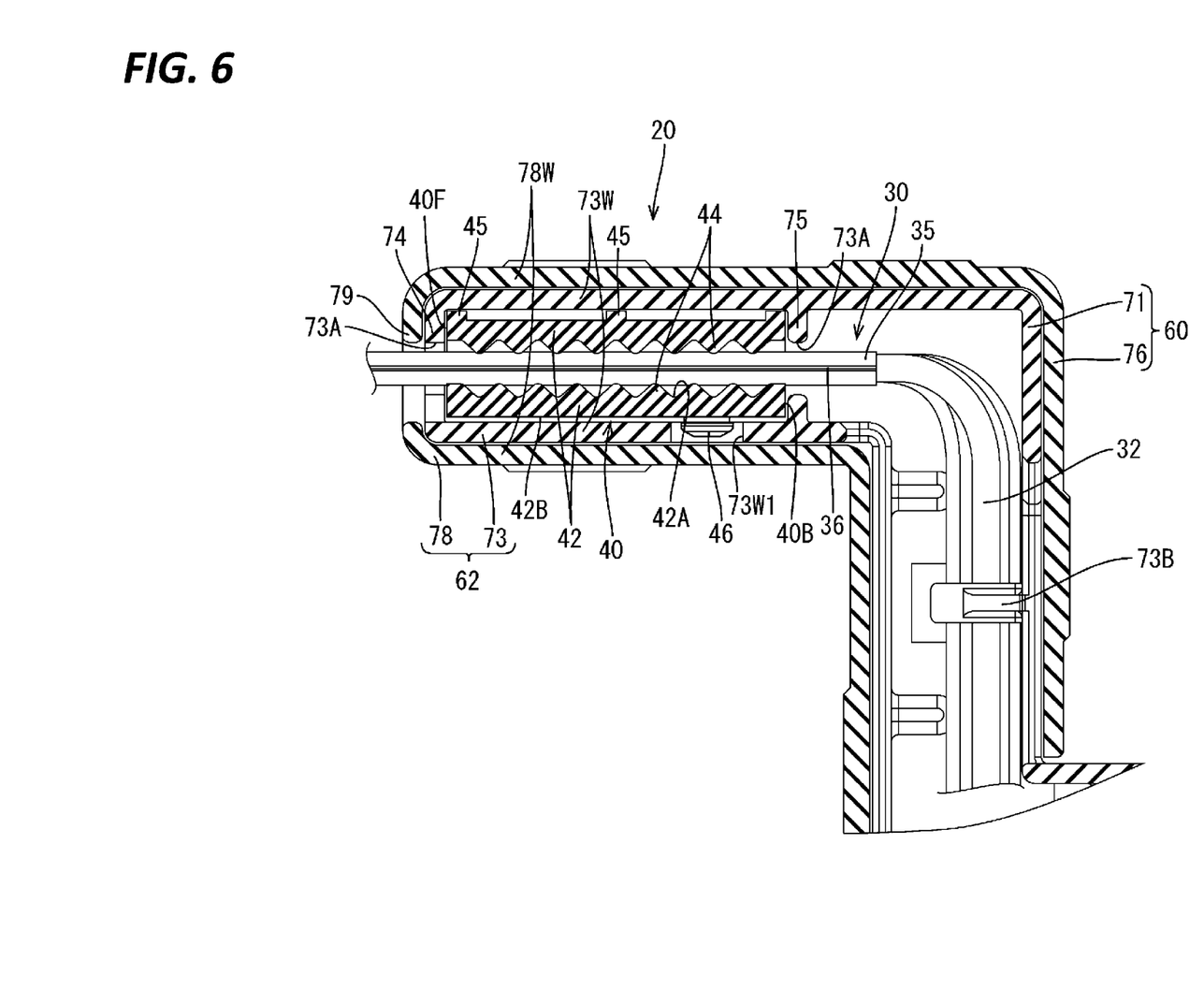
FIG. 6 is a section along B-B of FIG. 4.

As shown in FIGS. 5 and 6, the plurality of wires 32 are pulled out from the pair of base members 34 in both end parts of the base members 34. The wires 32 pulled out toward the seat S from the base members 34 are connected to various electrical components equipped in the seat S and the wires 32 pulled out toward the floor part are connected to unillustrated devices installed in the vehicle.

(Holding Member 40)

The holding member 40 is formed of synthetic resin. As shown in FIGS. 5 to 7 and 10, the holding member 40 is assembled with back end parts of the base members 34 of the wiring harness 30. The holding member 40 includes a pair of coupling portions 42 disposed along both lateral sides of the wiring harness 30, a pair of hinges 43 for linking lower end parts of the pair of coupling portions 42 to each other, and two pairs of sandwiching portions 50 provided on upper and lower end parts of the pair of coupling portions 42.

(Coupling Portions 42)

As shown in FIGS. 7 to 10, each of the pair of coupling portions 42 is in the form of a rectangular flat plate. The pair of hinges 43 for linking the pair of coupling portions 42 to each other and resiliently deformable are formed side by side in the front-back direction in lower end parts of the pair of coupling portions 42.

Figure 8:
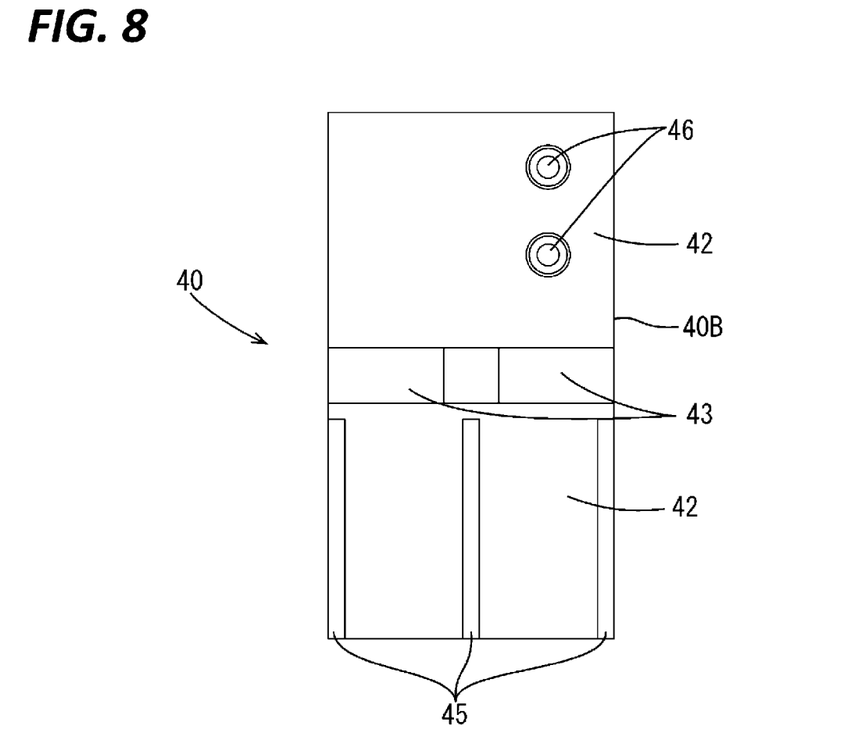
FIG. 8 is a bottom view of the holding member.
Figure 9:
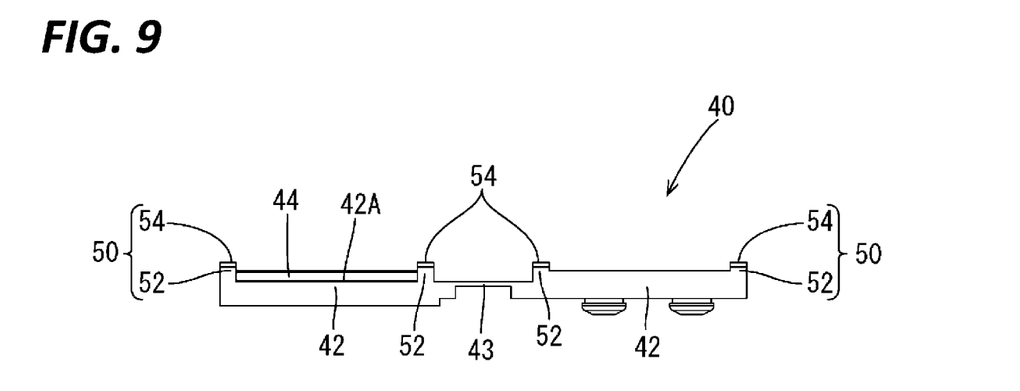
FIG. 9 is a front view of the holding member.

Before the holding member 40 is assembled with the wiring harness 30, the pair of coupling portions 42 are in such a state that the pair of hinges 43 extend straight and an inner surface 42A of each coupling portion 42 on the side of the wiring harness 30 faces upward as shown in FIGS. 7 to 9.

Figure 10:
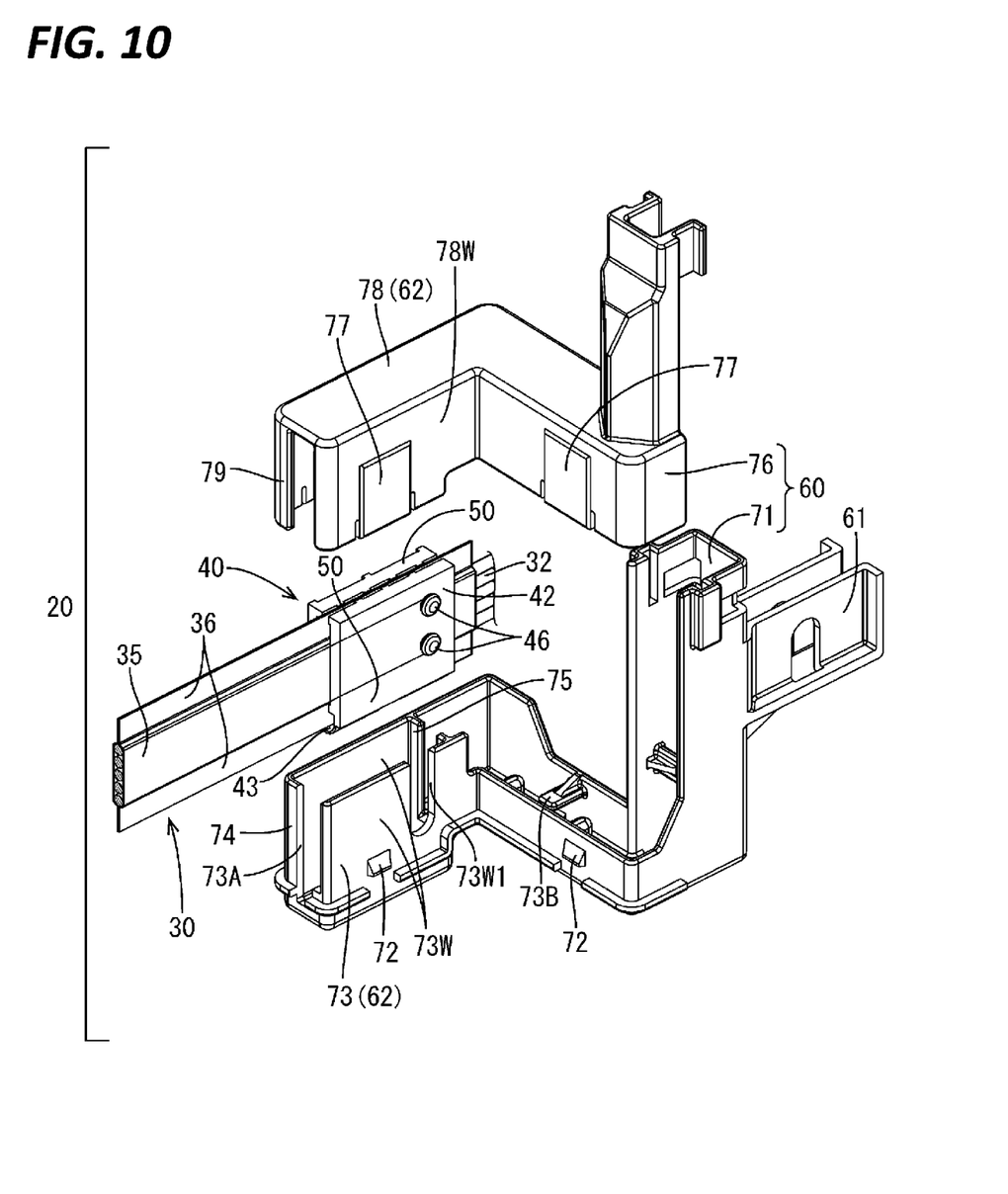
FIG. 10 is a perspective view showing a state before the holding member and a protector are assembled.

With the protector 60 assembled with the wiring harness 30, the pair of coupling portions 42 are arranged along both lateral sides of the wiring harness 30 by the pair of hinges 43 being folded in half and resiliently deformed as shown in FIGS. 5, 6 and 10.

As shown in FIGS. 6 and 7, a plurality of support ribs 44 in contact with the wire fixing portion 35 of the wiring harness 30 are formed on the inner surfaces 42A of the pair of coupling portions 42.

The respective support ribs 44 have a vertically extending triangular cross-section and are formed side by side in the front-back direction.

As shown in FIG. 6, the plurality of support ribs 44 in the pair of coupling portions 42 are arranged while being shifted in the front-back direction with the wiring harness 30 as a boundary. Accordingly, when the pair of coupling portions 42 are arranged on both lateral sides of the wiring harness 30, the support ribs 44 of the respective coupling portions 42 are arranged in a staggered manner in the front-back direction and contact the wire fixing portion 35 of the wiring harness 30. In this way, the wire fixing portion 35 can be supported from both lateral sides in the pair of coupling portions 42.

(Sandwiching Portions 50)

As shown in FIGS. 5 and 7, a pair of the sandwiching portions 50 include first projecting portions 52 projecting from the coupling portions 42 toward the margin portion 36 of the wiring harness 30 and a plurality of second projecting portions 54 further projecting from the first projecting portions 51 toward the margin portion 36.

The first projecting portion 52 is formed over the entire length of the coupling portion 42 in the front-back direction. The first projecting portion 52 projects from the coupling portion 42 toward the margin portion 36 slightly more than the support ribs 44 of the coupling portion 42.

The second projecting portions 54 are formed side by side in a row at intervals in the front-back direction. As shown in FIG. 5, the plurality of second projecting portions 54 in the pair of the sandwiching portions 50 are alternately arranged in the front-back and lateral directions with the wiring harness 30 as a boundary, similarly to the support ribs 44. A projection amount of the second projecting portions 54 from the first projecting portion 52 is set such that the tips of the second projecting portions 54 alternately arranged in the front-back direction are linearly arranged side by side in the front-back direction.

Accordingly, when the protector 60 is assembled with the wiring harness 30 and the pair of coupling portions 42 are arranged on both lateral sides of the wiring harness 30, the plurality of second projecting portions 54 in the pair of coupling portions 42 press the margin portions 36 alternately in the front-back direction from both sides in the lateral direction, and the margin portions 36 are arranged to meander in the lateral direction between the pairs of sandwiching portions 50 as shown in FIG. 5.

Two erroneous fitting detecting protrusions 46 projecting outward are formed on an outer side surface 42B of one 42 of the pair of coupling portions 42 as shown in FIG. 10. The erroneous fitting detecting protrusions 46 have a circular shape in a side view and are arranged side by side in the vertical direction.

A plurality of rectangular ribs 45 extending in the front-back direction are formed on an outer side surface 42B of the coupling portion 42 not formed with the erroneous fitting detecting protrusions 46, out of the pair of coupling portions 42. Three rectangular ribs 45 are formed in this embodiment, two of the three rectangular ribs 45 are formed on the front and back edges of the coupling portion 42, and the remaining one rectangular rib 45 is formed in a central part in the front-back direction of the coupling portion 42.

Accordingly, areas of the front and back end surfaces of the coupling portion 42 including the rectangular ribs 45 are larger than those of the other coupling portion 42.

(Protector 60)

Figure 11:
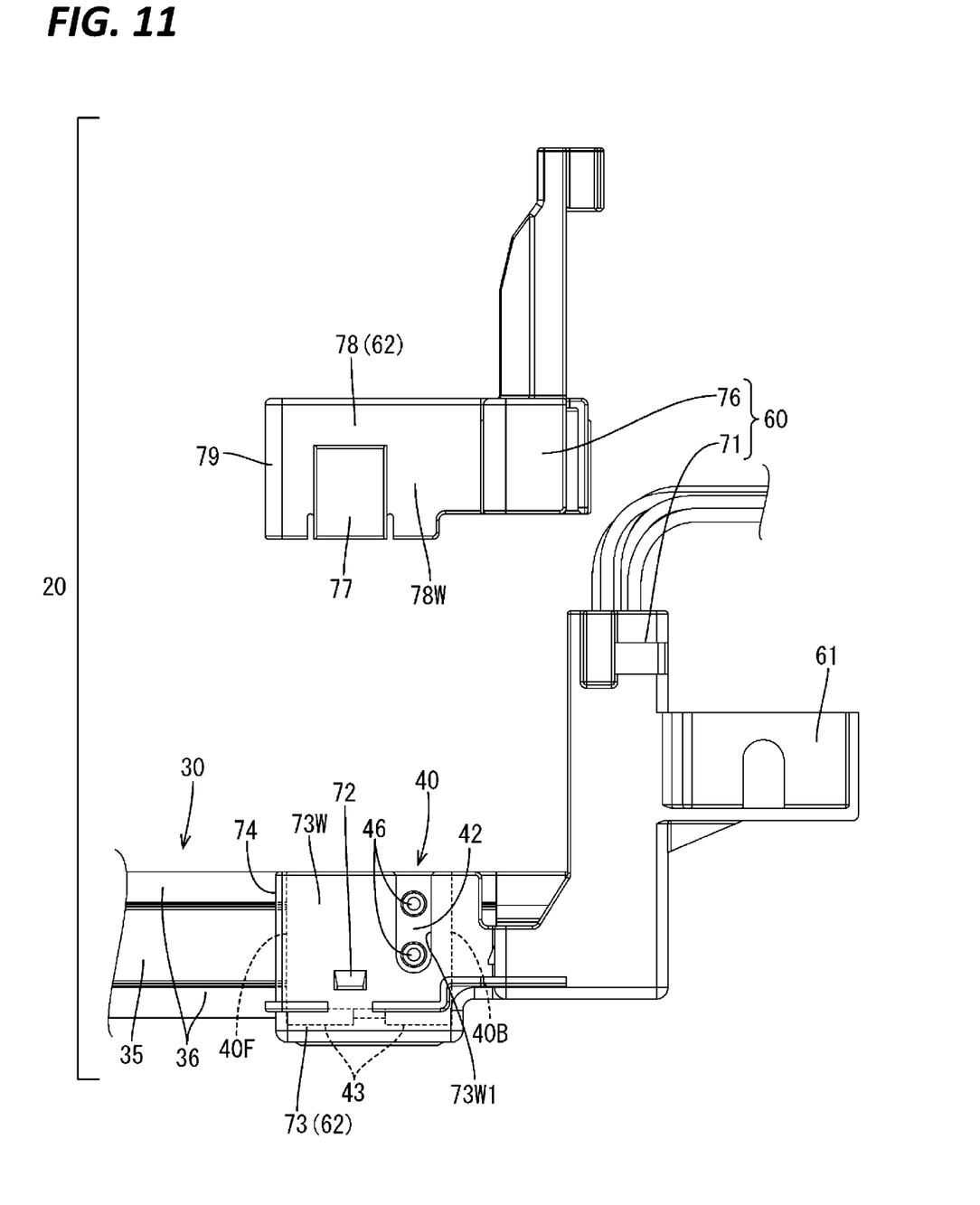
FIG. 11 is a side view showing a state before a lower member having the holding member accommodated in an accommodation recess and an upper member are assembled.

The protector 60 is formed of synthetic resin. As shown in FIGS. 10 and 11, the protector 60 is configured by integrally assembling a lower member 71 and an upper member 76 dividable in the vertical direction by locking a lock portion 77 formed on the upper member 76 to a locked member 72 formed on the lower member 71.

Figure 4:
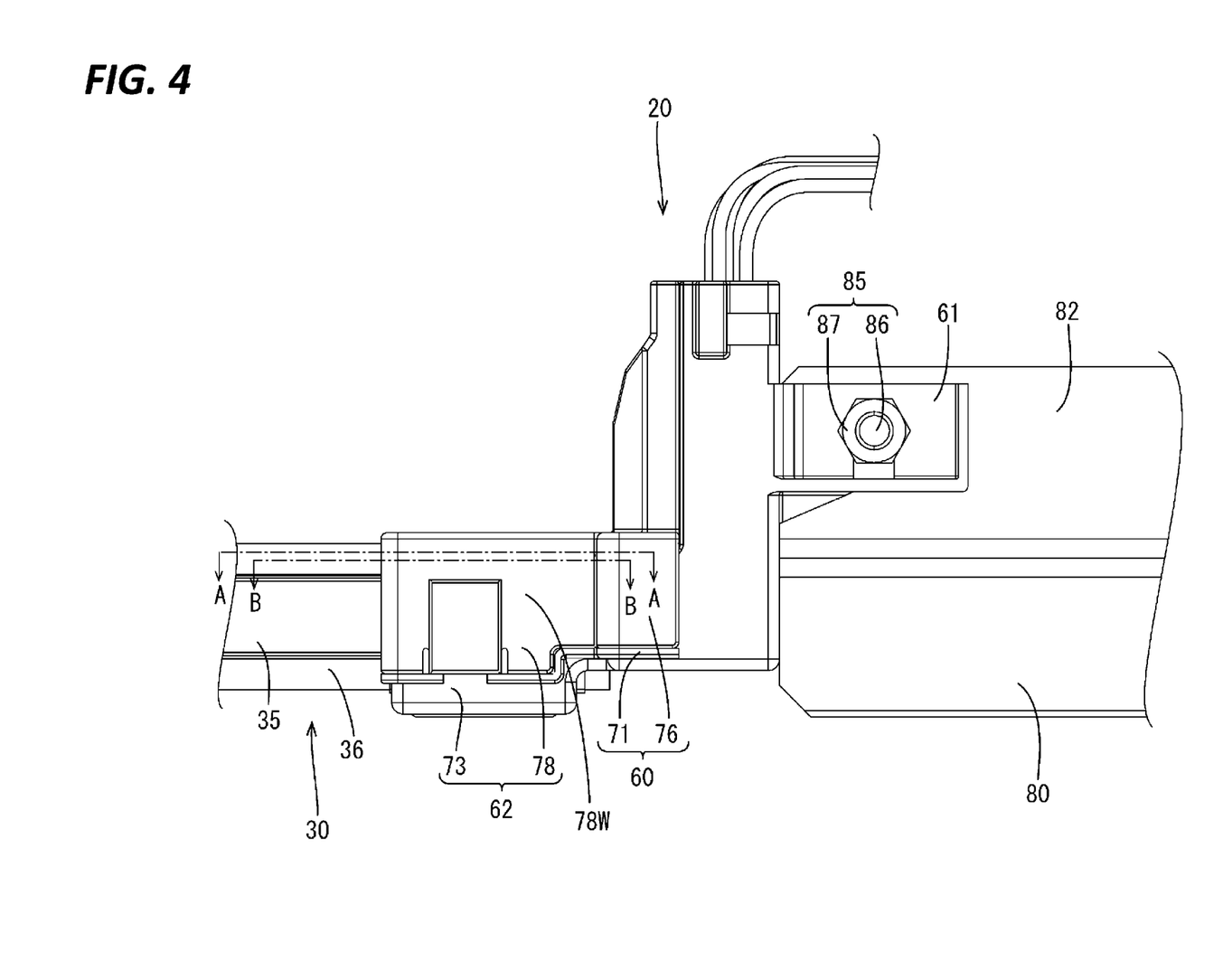
FIG. 4 is a side view of the wiring harness module attached to the slider.

As shown in FIGS. 3 and 4, the protector 60 is in the form of an L-shaped rectangular tube composed of a part extending in the vertical direction and a part extending toward a right-front side from a lower end part of the former part.

A mounting piece 61 is formed on a back end part of the protector 60. The mounting piece 61 is fastened to the mounting portion 82 of the slider 80 by a fastening member 85 including a bolt 86 and a nut 87. In this way, the protector 60 and, consequently, the wiring harness module 20 are fixed to the slider 80.

The wiring harness 30 can be inserted into the protector 60 and an accommodating portion 62, into which the holding member 40 is fittable from above, is provided in a front end part of the protector 60.

As shown in FIGS. 5, 6 and 10, the accommodating portion 62 is configured by fitting an accommodation recess 73 formed in the lower member 71 and a receptacle 78 formed in the upper member 76 in the vertical direction.

The accommodation recess 73 includes a front wall 74 facing a front end surface 40F of the holding member 40 in the front-back direction, a back wall 75 facing a back end surface 40B of the holding member 40 in the front-back direction, and a pair of side walls 73W connected to the front wall 74 and the back wall 75, and is in the form of a rectangular parallelepiped box having a rectangular opening open upward.

The holding member 40 in a properly arranged state with the hinges 43 arranged on a lower side can be accommodated into the accommodation recess 73 from above. The front wall 74 and the back wall 75 of the accommodation recess 73 are formed with insertion slits 73A into which the wiring harness 30 is inserted. The insertion slits 73A are formed to extend downward from the upper edges of the front wall 74 and the back wall 75, and the wiring harness 30 is inserted thereinto from above when the holding member 40 is accommodated into the accommodation recess 73. The wiring harness 30 pulled out forward from the insertion slit 73A is pulled into the harness accommodating portion 11 through the rail 90, and the wiring harness 30 pulled out backward from the insertion slit 73A is pulled out upward while the lift thereof is restricted by a wire presser 73B provided in the protector 60.

A height and lengths in front-back and lateral directions inside the accommodation recess 73 are substantially equal to those of the protector 60. Here, substantially equal means a case where the height and the lengths in the front-back and lateral directions of the protector 60 are equal to those inside the accommodation recess 73 and a case where the height and the lengths in the front-back and lateral directions of the protector 60 are not equal to those inside the accommodation recess 73, but can be regarded as being substantially equal.

Accordingly, when the holding member 40 is accommodated into the accommodation recess 73 from above, the front end surface 40F of the holding member 40 and the front wall 74 of the accommodation recess 73 can be locked in the front-back direction and the back end surface 40B of the holding member 40 and the back wall 75 of the accommodation recess 73 can be locked in the front-back direction as shown in FIGS. 5 and 6.

That is, the forward detachment of the holding member 40 from the protector 60 is prevented by locking the front end surface 40F of the holding member 40 and the front wall 74 in the front-back direction. Further, a backward shift of the holding member 40 in the protector 60 is prevented by locking the back end surface 40B of the holding member 40 and the back wall 75 in the front-back direction. Further, the pair of coupling portions 42 of the holding member 40 and the pair of side walls 73W of the accommodation recess 73 contact in the lateral direction, thereby restricting the expansion of the pair of coupling portions 42 in the lateral direction in the accommodation recess 73.

As shown in FIGS. 5, 6 and 10, one side wall 73W located on a lateral side of the accommodation recess 73 is formed with an erroneous fitting detecting groove 73W1 extending downward from the upper edge of the side wall 73W. A depth of the erroneous fitting detecting groove 73W1 is set such that the two erroneous fitting detecting protrusions 46 of the holding member 40 are completely accommodated in the erroneous fitting detecting groove 73W1.

The erroneous fitting detecting protrusions 46 are accommodated into the erroneous fitting detecting groove 73W1 when the holding member 40 in the properly arranged state is fit into the accommodation recess 73. That is, the erroneous fitting detecting groove 73W1 and the erroneous fitting detecting protrusions 46 have a function of preventing the holding member 40 in an improperly arranged state by being inverted in the front-back direction or inverted in the vertical direction from being erroneously fit into the accommodation recess 73.

On the other hand, as shown in FIG. 10, the receptacle 78 of the upper member 76 is formed to be open downward and the accommodation recess 73 is fittable into the receptacle 78 from below. As shown in FIGS. 5 and 6, the receptacle 78 includes an outer front wall 79 facing the front wall 74 of the accommodation recess 73 in the front-back direction and a pair of outer side walls 78W arranged along the outer surfaces of the respective side walls 73W of the accommodation recess 73. Thus, when the accommodation recess 73 is fit into the receptacle 78, the outer front wall 79 can lock the front end surface 40F of the holding member 40 from front via the front wall 74 of the accommodation recess 73. Further, the outer side walls 78W restrict the expansion of the pair of coupling portions 42 in the lateral direction via the side walls 73W of the accommodation recess 73.

That is, as shown in FIGS. 5 and 6, the holding member 40 is doubly locked from front by the front wall 74 of the accommodation recess 73 and the outer front wall 79 of the receptacle 78 in the accommodating portion 62. Further, the pair of coupling portions 42 are doubly restricted from expanding in the lateral direction by the side walls 73W of the accommodation recess 73 and the outer side walls 78W of the receptacle 78.

This embodiment is configured as described above. Next, functions and effects of the wiring harness routing device 10 are described.

For example, in a wiring harness routing device for firmly fixing a wiring harness formed by bundling a plurality of wires to a slidable movable holder by a binding member, the binding member bites into the wires if a large load is applied to the wires as the movable holder moves. If the binding member bites into the wires to a large extent, the wires may be damaged.

Accordingly, the present inventors diligently studied to solve the above problem and, as a result, found out the configuration of this embodiment. That is, this embodiment relates to the wiring harness routing device 10 with the wiring harness module 20 including the wiring harness 30 having at least one wire 32 fixed along the strip-like base members 34, the holding member 40 for holding the sheet-like margin portions 36 different from the wire fixing portion (part) 35 fixed to the wires 32 in the base members 34, and the protector 60 to be mounted on the slidable slider 80, wherein the protector 60 includes the accommodating portion 62 for accommodating the holding member 40 and the accommodating portion 62 has the front wall (locking portion) 74 and the back wall (locking portion) 75 lockable to the holding member 40 in the front-back direction (extending direction of the wiring harness 30) as shown in FIGS. 5 and 6.

According to the wiring harness module 20 thus configured, the margin portions 36 different from the wire fixing portion 35 are held by the holding member 40 and the holding member 40 holding the margin portions 36 is accommodated into the accommodating portion 62 of the protector 60. Since the holding member 40 can be locked to the front wall 74 and the back wall 75 of the accommodating portion 62 in the front-back direction in the accommodating portion 62, the wiring harness 30 can be so fixed to the slider 80 as not to shift in position.

Further, if such a load as to pull the wiring harness 30 is applied to the wiring harness 30, the load is applied to the margin portions 36 of the wiring harness 30, the holding member 40 and the front wall 74 and the back wall 75 of the protector 60. That is, the application of the load to the wires 32 can be suppressed and the damage of the wires 32 can be suppressed.

The holding member 40 of this embodiment includes at least one pair of sandwiching portions 50 for sandwiching the margin portion 36 from both sides, and each sandwiching portion 50 includes the plurality of second projecting portions (protrusions) 54 projecting toward the margin portion 36 as shown in FIG. 5.

That is, according to this embodiment, the plurality of second projecting portions 54 of the pair of sandwiching portions 50 bite into the margin portion 36 of the base members 34, whereby the detachment of the wiring harness 30 from the protector 60 can be suppressed. Further, according to this configuration, a reduction in the strength of the margin portion 36 can be prevented, for example, as compared to the case where a margin portion is held by a holding member penetrating through the margin portion.

In this embodiment, the plurality of second projecting portions 54 in one 50 of the pair of sandwiching portions 50 and the plurality of second projecting portions 54 in the other 50 of the pair of sandwiching portions 50 are alternately arranged and the margin portion 36 is arranged to meander between the plurality of second projecting portions 54 alternately arranged as shown in FIG. 5.

That is, according to this embodiment, the second projecting portions 54 can bite into the margin portion 36 to an increased extent, for example, as compared to the case where the plurality of second projecting portions 54 are arranged at the same positions between the pair of sandwiching portions with the margin portion 36 as a boundary. In this way, a holding force for the wiring harness 30 in the protector 60 can be enhanced.

The six (plurality of) wires 32 are fixed side by side along the base members 34, the margin portions 36 are formed on both sides of the wire fixing portion 35 fixed to the wires 32, the holding member 40 includes two pairs of sandwiching portions 50 for sandwiching the respective margin portions 36 as shown in FIG. 10, the two pairs of sandwiching portions 50 are coupled by the pair of coupling portions 42 and the pair of coupling portions 42 are further coupled by the hinges 43.

That is, according to this embodiment, a load applied to the wiring harness 30 can be distributed to both sides of the wire fixing portion 35 fixed to the wires 32 in the wiring harness 30. Thus, a load applied to the margin portions 36 can be reduced as compared to the case where a load is applied to one end part of the wiring harness 30. In this way, the holding force for the wiring harness 30 in the protector 60 can be enhanced.

Further, according to this embodiment, the two pairs of the sandwiching portions 50 are coupled by the pair of coupling portions 42 and the pair of coupling portions 42 are coupled by the hinges 43. That is, since the holding member 40 can be constituted by a single member, an increase in the number of components can be suppressed and an assembly operation of assembling the holding member 40 with the wiring harness 30 can be facilitated, for example, as compared to the case where the respective sandwiching portions are individually configured.

Other Embodiments

The technique disclosed in this specification is not limited to the above described and illustrated embodiment and also includes, for example, the following various modes.

(1) In the above embodiment, the wiring harness 30 includes the five wires 32. However, without limitation to this, a wiring harness may be composed of four or less or six or more wires and wire diameters of the wires may be arbitrarily changed.

(2) In the above embodiment, the wiring harness 30 is configured such that the plurality of wires 32 are sandwiched by the pair of base members 34. However, without limitation to this, a wiring harness may be configured such that a plurality of wires are fixed to one surface of one base member.

(3) In the above embodiment, the pair of coupling portions 42 are open between upper end edge parts thereof. However, without limitation to this, a lock mechanism for preventing the opening of a pair of coupling portions may be provided on upper edge parts of the pair of coupling portions.

(4) In the above embodiment, the holding member 40 is configured to sandwich the margin portion 36 of the wiring harness 30 by the pair of sandwiching portions 50. However, without limitation to this, a margin portion may be held by a holding member penetrating through the margin portion in the lateral direction.

(5) In the above embodiment, the pair of coupling portions 42 include the plurality of support ribs 44. However, without limitation to this, a pair of coupling portions may be configured not to contact a wire fixing portion.

LIST OF REFERENCE NUMERALS

10: wiring harness routing device
11: harness accommodating portion
20: wiring harness module
30: wiring harness
32: wire
34: base member
35: wire fixing portion
36: margin portion
40: holding member
40B: back end surface of holding member
40F: front end surface of holding member
42: coupling portion
42A: inner surface of coupling portion
42B: outer side surface of coupling portion
42D: lower end part of coupling portion
43: hinge
44: support rib
45: rectangular rib
46: erroneous fitting detecting protrusion
50: sandwiching portion
52: first projecting portion
54: second projecting portion
60: protector
61: mounting piece
62: accommodating portion
71: lower member 72: locked member
73: accommodation recess
73A: insertion slit
73B: wire presser
73W: side wall
73W1: erroneous fitting detecting groove
74: front wall
75: back wall
76: upper member
77: lock portion
78: receptacle
78W: outer side wall
79: outer front wall
80: slider
82: mounting portion
85: fastening member
86: bolt
87: nut
90: rail
92: through groove
S: seat

What is claimed is:

1. A wiring harness module, comprising:
a wiring harness having at least one wire fixed along a strip-like base member;
a holding member configured to hold a sheet-like margin portion different from a part fixed to the wire in the base member; and
a protector to be mounted on a slidable slider,
wherein:
the protector includes an accommodating portion that accommodates the holding member and includes a receptacle formed to be open downward and an accommodation recess fittable into the receptacle from below, and
the accommodation recess includes front and back walls lockable to front and back end surfaces of the holding member, respectively in a length direction of the wiring harness.

2. The wiring harness module of claim 1, wherein:
the holding member includes at least one pair of sandwiching portions that sandwich the margin portion from both sides of the margin portion and are coupled by a coupling portion that is coupled by a hinge, and
each sandwiching portion includes a plurality of protrusions projecting toward the margin portion.

3. The wiring harness module of claim 2, wherein:
the plurality of protrusions in one of the pair of sandwiching portions and the plurality of protrusions in the other of the pair of sandwiching portions are alternately arranged, and
the margin portion is arranged to meander between the plurality of protrusions alternately arranged.

4. The wiring harness module of claim 2, wherein:
a plurality of the wires are fixed side by side along the base member,
the margin portion is formed on each of both sides of the part fixed to the wires,
the holding member includes two pairs of sandwiching portions that sandwich respective margin portions,
the two pairs of sandwiching portions are coupled by a pair of coupling portions, and
the pair of coupling portions are further coupled by the hinge.

5. A wiring harness routing device, comprising:
the wiring harness module of claim 1; and
an extra length accommodating portion that accommodates an extra length of the wiring harness of the wiring harness module.

* * * * *